May 10, 1966 W. ANGER 3,250,041
DOOR STRUCTURES
Filed Aug. 27, 1963 2 Sheets-Sheet 1

INVENTOR
WILHELM ANGER
BY
ATTORNEY.

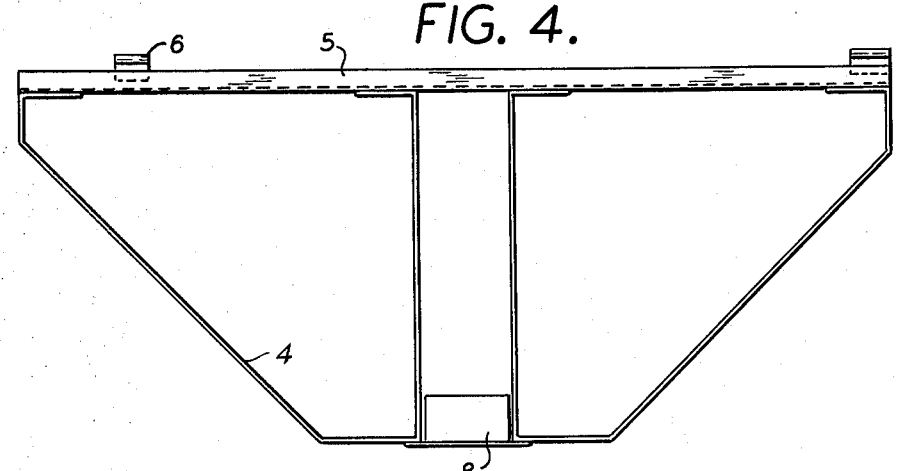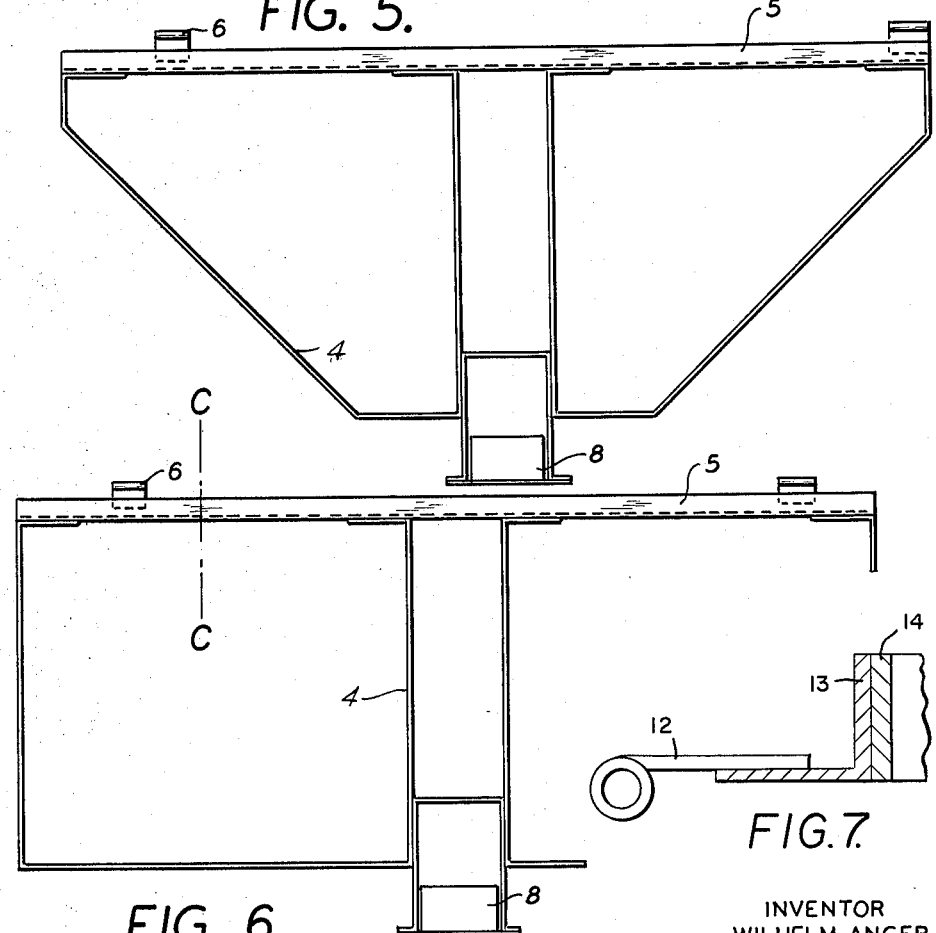

United States Patent Office 3,250,041
Patented May 10, 1966

3,250,041
DOOR STRUCTURES
Wilhelm Anger, Linz, Austria, assignor to Dorplastex A.G., Zug, Switzerland, a corporation of Switzerland
Filed Aug. 27, 1963, Ser. No. 304,796
7 Claims. (Cl. 49—501)

This invention relates to door structures, especially of the standard type for use in building of any type, homes, or for industrial applications.

It is an object of the invention to provide doors or panels generally complying with a number of different standards established by building code, custom, industrial regulations or other types of rules in such a way that they can be readily applied by the professional or private builder or user in the same way as existing door structures and with a minimum of work or adaptation to existing or varying requirements.

A further object of the invention is a door consisting of a center panel or core of plastic foam material having embedded therein a metal, for example a steel frame consisting of linear elements and having attached thereto or formed thereon hinge elements projecting sideways through the foam from the door, on one side thereof, and having on the other side extending therefrom or formed thereon locking parts or elements, or at least supports therefor, also accessible from the outside of the door.

As a specific object of the invention, the foam core is provided with its metallic insert, consisting preferably of band iron, for example forming two trapezoids connected on their vertical bases, by embedding the metallic inserts during the foaming process in a separate mold, permitting the use of relatively high pressure foaming material such as polystyrene.

As an alternative and also in accordance with the invention, the plastic front and rear cover sheets with their edges attached to each other are used as a mold for the foaming process, which in this case may involve a relatively low pressure plastic foaming material such as polyurethane.

Still another object of the invention is to arrange the insert in the foaming material not by embedding it during the foaming process, but by pressing the insert into a preformed foam panel, preferably into preformed or premachined grooves corresponding to the shape of the insert and which will permit together with another preformed foam panel which can be glued or otherwise attached to the first panel, to form the foam core of the door, to which thereafter the solid plastic cover sheets are attached by gluing or in any other appropriate manner.

These and other objects of the invention will be more fully apparent from the drawings annexed herein in which:

FIGS. 4, 5 and 6 represent different shapes of metal inserts for the door structure, and FIG. 7 shows a portion of such an insert at an enlarged scale in a horizontal cross-section along line C—C of FIG. 6 perpendicular to the plane of the door.

Figure 1:
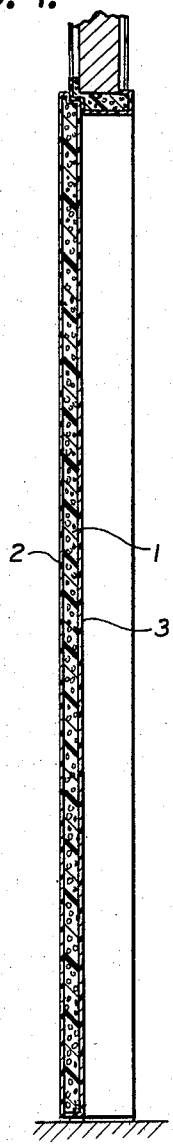
FIG. 1 represents a door and post structure embodying certain principles of the invention in a vertical cross section taken along the lines A—A of FIGURE 2.

Foam core 1 has embedded therein either by direct casting or subsequent machining a steel core consisting of band iron 4 welded together and attached to a longitudinal piece of angle iron 5.

Structures 4, 5 carries welded thereto hinges 6, which are so dimensioned as to project from core 1.

Structures 4, 5 also serve to support at parts 7 welded thereto a lock 8.

Figure 2:
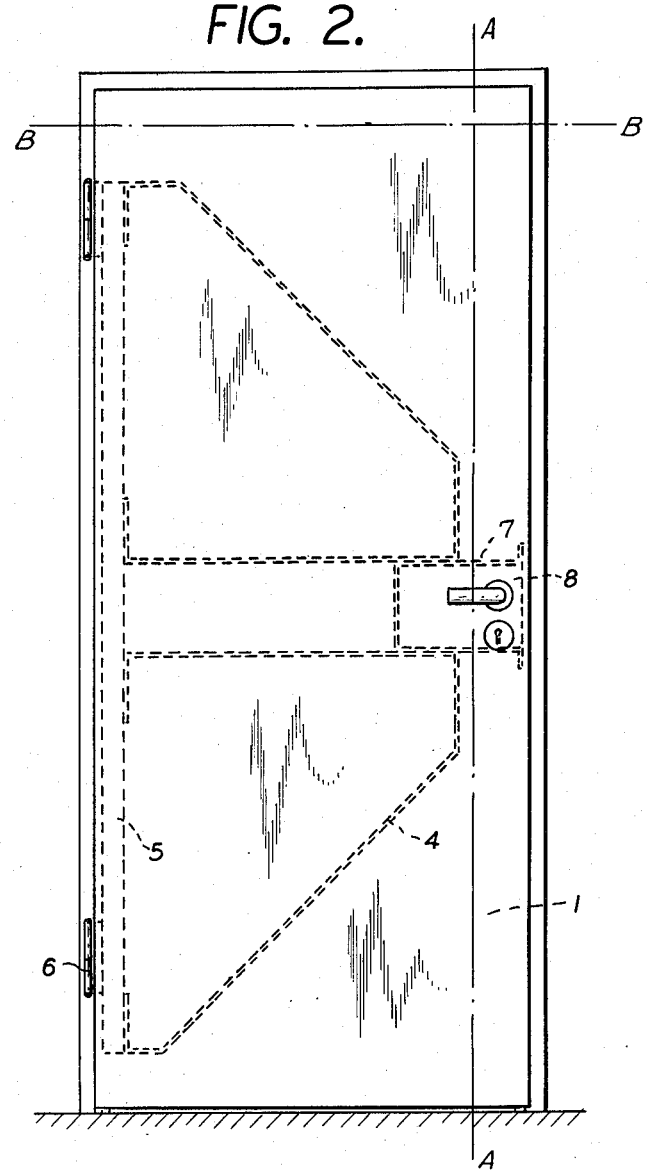
FIG. 2 represents a corresponding front elevation, and FIG. 3 in a horizontal cross-section along line B—B of FIG. 2 a corresponding top view.
Figure 3:
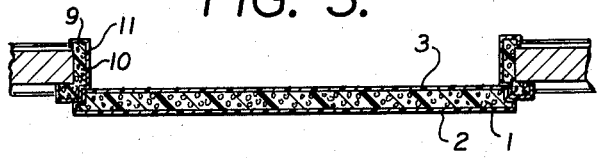

The door posts schematically indicated in FIGS. 2 and 3 at 9 also consist of a foam core 10, encased at least partially by a solid profiled channel sheet, for example of solid polyvinylchloride plastic, schematically indicated at 11, as will be explained below in greater detail.

FIGS. 4, 5, and 6 show different shapes of metal inserts for the door, and FIG. 7 in cross-section shows the attachment of a hinge 12 to an L-shaped angle piece 13, to which the band iron portions 14 of the metal insert is welded.

The finished door structures can be coated with a removable protective coating such as consisting of polyethylene spray, to protect their surface during handling, transportation, storage, assembly, etc. as schematically indicated in FIG. 1 at 23.

In order to further reduce cost and exploit the structural characteristics and properties of the disclosed door structures, the solid plastic cover sheets such as indicated at 2, 3 may be provided with an appropriate coloring or design incorporated therein in otherwise well known manner, or they may be made translucent or transparent, and the design be applied thereto preferably on its back, i.e. the side adjacent to the foam core such as indicated at 1, by printing or other transfer processes, for example from photomechanically reproduced printing plates or rollers. This type of printing or transfer process may be especially useful to produce exact reproductions of expensive wood veneers.

As an alternative, decoration bearing sheets or layers for example made of plastic may be inserted between solid sheets such as indicated at 2, 3 and foam core such as indicated at 1, without departing from the spirit of this invention.

The invention is not limited to the materials, elements, methods, element connections and production steps shown and described, but may be applied in any appropriate form or manner whatsoever without departing from the scope of this disclosure.

I claim:

1. Door structure comprising a core panel of plastic foam, sheets of solid plastic thinner than said foam core covering at least the greater part of its front and rear surfaces, said foam core having at least one insert of linear stiffeneing elements extending therethrough, said insert comprising bands forming two adjacent trapezoids arranged one above the other in a vertical plane wherein their bases are interconnected and are parallel to and adjacent a first vertical edge of the door, said trapezoids each having sides perpendicular to their respective bases and adjacent each other, said perpendicular sides extending horizontally of the core toward the other vertical edge of the door and having locking means connected thereto, and hinging means on said first vertical edge of the door being connected to the trapezoids at their bases.

2. Structure according to claim 1 comprising extensions connecting said parallel and perpendicular sides, respectively, to said hinging and locking means, and projecting in opposite directions at opposite sides of said foam core.

3. Structure according to claim 1 wherein said foam core consists of a whole piece of plastic foam which contains said insert embedded therein and to which said solid plastic sheets are attached, at least on said front and rear surfaces.

4. Structure according to claim 1 wherein said foam core consists of polystyrene foam and said covering sheets consist of polyvinylchloride.

5. Structure according to claim 1 wherein said foam core consists of polyuethane foam and said covering sheets consist of polyvinylchloride.

6. Structure according to claim 1 wherein said insert consists of metal band.

7. Structure according to claim 1 wherein said insert consists of metal band forming two adjacent trapezoids, one arranged above the other and both interconnected at their bases being arranged horizontally with respect to the natural position of the door.

References Cited by the Examiner

UNITED STATES PATENTS

| | | | |
|---|---|---|---|
| 1,416,943 | 5/1922 | Broughton | 50—118 |
| 2,033,884 | 3/1936 | Davison | 20—35 |
| 2,074,482 | 3/1937 | Martens | 160—236 |
| 2,278,756 | 4/1942 | Weight | 156—228 |
| 2,562,711 | 7/1951 | Gessler et al. | 161—413 X |
| 2,611,153 | 9/1952 | Semegen. | |
| 2,698,677 | 1/1955 | Tadd | 189—64 |
| 2,833,004 | 5/1958 | Johnson et al. | 20—35 X |
| 2,871,056 | 1/1959 | Levitt | 20—35 X |
| 2,916,781 | 12/1959 | Fengler | 20—11 |
| 2,924,860 | 2/1960 | Parham et al. | 20—35 |
| 2,924,861 | 2/1960 | Viets | 20—35 |
| 2,973,800 | 3/1961 | Muccino | 156—228 |
| 3,040,390 | 6/1962 | Carlton | 20—11 |
| 3,089,202 | 5/1963 | Pulaski | 20—35 X |
| 3,153,817 | 10/1964 | Pease | 189—46 X |

FOREIGN PATENTS 29,002    3/1904    Switzerland.

HARRISON R. MOSELEY, *Primary Examiner.*

REINALDO P. MACHADO, P. C. KANNAN,
*Assistant Examiners.*